United States Patent
Colvig et al.

(10) Patent No.: US 7,257,713 B2
(45) Date of Patent: Aug. 14, 2007

(54) AUTOMATIC PASSWORD CONFIGURATION DURING ERROR REPORTING

(75) Inventors: Arthur John Colvig, Tucson, AZ (US); Brian Gerard Goodman, Tucson, AZ (US); Robin Daniel Roberts, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 10/155,062

(22) Filed: May 24, 2002

(65) Prior Publication Data

US 2003/0221120 A1 Nov. 27, 2003

(51) Int. Cl.
*H04K 1/00* (2006.01)
*G06F 7/04* (2006.01)
*G06F 9/00* (2006.01)

(52) U.S. Cl. .............................. 713/182; 726/2; 726/27

(58) Field of Classification Search ................ 713/182; 726/4, 5, 7, 17, 21, 26, 30, 29
See application file for complete search history.

(56) References Cited

U.S. PATENT DOCUMENTS 5,724,426 A * 3/1998 Rosenow et al. ............. 726/29
5,889,860 A * 3/1999 Eller et al. ..................... 726/6

* cited by examiner

*Primary Examiner*—Emmanuel L. Moise
*Assistant Examiner*—Courtney D. Fields
(74) *Attorney, Agent, or Firm*—Scully, Scott, Murphy & Presser, P.C.; Robert Sullivan, Esq.

(57) ABSTRACT

A system and method for generating access authorization in a secure manner. After establishing data communications, a product and product center exchange unique information for the independent generation of a valid access authorization by both the product and product center. The access authorization then allows a computer system associated with the product center to access the product for testing, diagnostics, etc. An added security feature invalidates the access authorization after a predetermined time period.

45 Claims, 5 Drawing Sheets

AUTOMATIC PASSWORD CONFIGURATION DURING ERROR REPORTING

FIELD OF INVENTION

The present invention generally relates to the field of computer security. More specifically, the present invention is directed to a system and method for automatically transferring unique data between an access authorization protected computer system and a computer system requesting to access the protected computer system in such a manner as to provide the proper access authorization to successfully establish an authorized data communications connection between the computer systems.

BACKGROUND

In the data storage and server industry, an effort is being made by manufacturers to offer more reliable data storage and server products. Such efforts include the provision of 24×7×365 support services aimed to minimize any customer down time that may result from error(s), including but not limited to a product system, product component, or product software errors, or, minimize any repair action that results from the error. One system feature, referred to as "Call Home", is a fault reporting and remote dial-out diagnostic service feature that has been available in many server products (e.g., entry, midrange, high-end, mainframe, etc.) and data storage products. Such Call Home feature is preferably built into the server and/or data storage product and devised to automatically contact a remote customer repair facility in the event that some error has occurred. One particular product that is provided with the Call Home feature is an automated storage library, such as the IBM 3584 Ultra Scalable Tape Library which is a system designed for cost-effectively handling a wide range of data storage services including backup, archive, and disaster recovery data storage needs.

Figure 1:
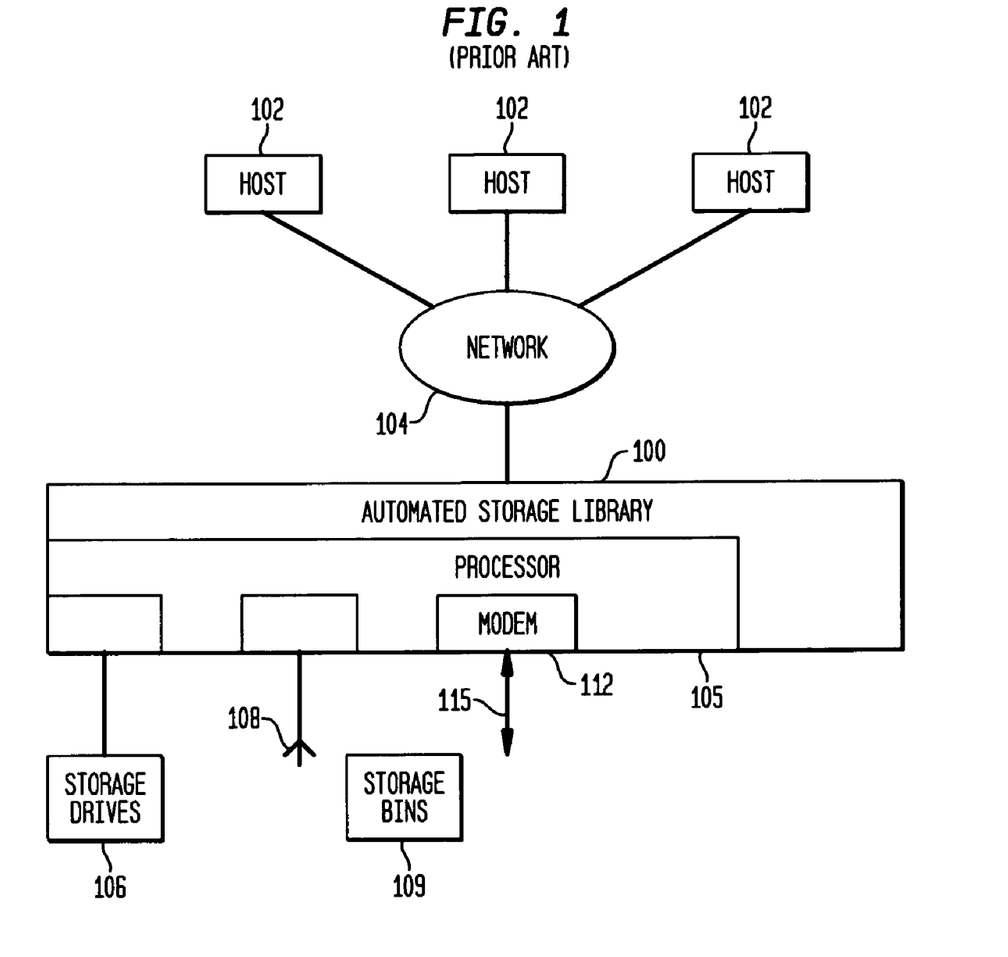
FIG. 1 shows a prior art storage library environment.

FIG. 1 illustrates an exemplary automated storage library 100 having the built in Call Home feature. As shown in FIG. 1, the automated storage library 100 includes one or more storage drives 106, storage bins 109, and, a robotic picker including gripper mechanisms 108 for moving removable media (e.g., tape) between the storage drives 106 and storage bins 109. The Call Home feature is provided to automatically contact a remote customer repair facility in the event that some error has occurred. Any communication between a host system 102 and the automated storage library 100 may occur over a communications network 104, such as a POTS, Internet, or the like. For example, the Call Home feature may automatically contact a repair facility through a dial-up MODEM 112 over communications link 115, the Internet, or some other communication mechanism. Generally, a Call Home record is generated that includes detailed information about the error and any related information, such as diagnostic logs, etc. In some instances, however, more information is required by the repair center because it may not be practical to anticipate every piece of information that may be needed in the Call Home record. For example, product center personnel may wish to inspect certain areas of product memory that were not reported in the Call Home record. In such cases, the repair center may use another feature such as Call In, which is a feature that permits repair personnel to contact the storage product from a remote location. As with Call Home, this communication may be established with a dial-up MODEM, the Internet, or some other communication media/mechanism. The Call In feature further allows for the diagnosis of problems without actually going to the customer site. This can save a great deal of time because a visit to the customer site does not have to be scheduled and there is no travel time associated with such activity.

While a beneficial support feature, the Call In function has a drawback in the area of logon security and, particularly, the use of fixed passwords. With the current call in function, unauthorized access to a customer machine is possible which could lead to a number of undesirable consequences including intentional or unintentional disruption of customer services. For example, a repair person of a prior art repair center that had performed a diagnostic/support service and had access to the customer's fixed password in the performance of the service, may be enabled to subsequently gain unauthorized access to that customer's system. Related art methods have not adequately addressed the issue of logon security where there is a need to authorize limited repair center access to a customer machine. Thus, for example, a password that is initially shared between the access grantor and the access requester is more easily detected by unauthorized surveillance and therefore remains a logon security risk. The prior art simply has a need for a more secure logon, i.e., access method that is dynamic and unpredictable.

SUMMARY OF THE INVENTION

Therefore, it is an object of the present invention to provide a system and method for generating dynamically changing, unique and unpredictable access authorizations when an authorized user requires access to a computer system.

Another object of the present invention is to increase security in a computer system by using a combination of unique data from both the system requesting access to the computer and the system granting access to generate the access authorization.

A further object of the present invention is to provide a system and method for causing the access authorization to be generated based on unique data which may be sent by the system granting access.

Yet another object of the present invention is to provide a system and method for providing more secure and unpredictable password authorization for establishing a more secure connection between a remote repair entity and a customer server/data storage product in connection with a repair center-to-product Call In feature.

These and other objects and advantages may be obtained in the present invention by providing a system and method that implements secure and dynamic product access authorization. Specifically, there is provided a method for access to a computer system requiring access authorization that comprises: transferring unique data between a first and second computer systems; the computer systems each generating an access authorization from the unique data; and validating the access authorization enabling successful access to the second computer system.

BRIEF DESCRIPTION OF THE DRAWING

The present invention will now be described in more detail by referring to the drawings that accompany the present application. It is noted that in the accompanying drawings like reference numerals are used for describing like and corresponding elements thereof.

DETAILED DESCRIPTION OF THE PREFERRED EMBODIMENT

Figure 2:
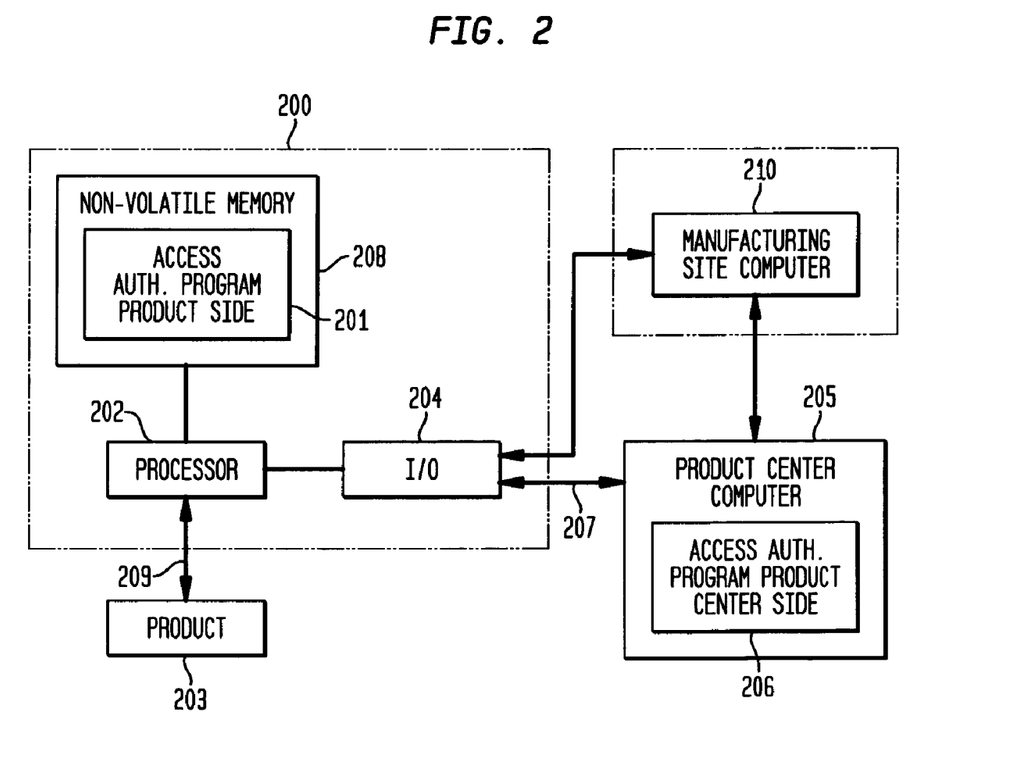
FIG. 2 depicts an example of the software and hardware architecture implementing the functionality of the present invention.
Figure 4:
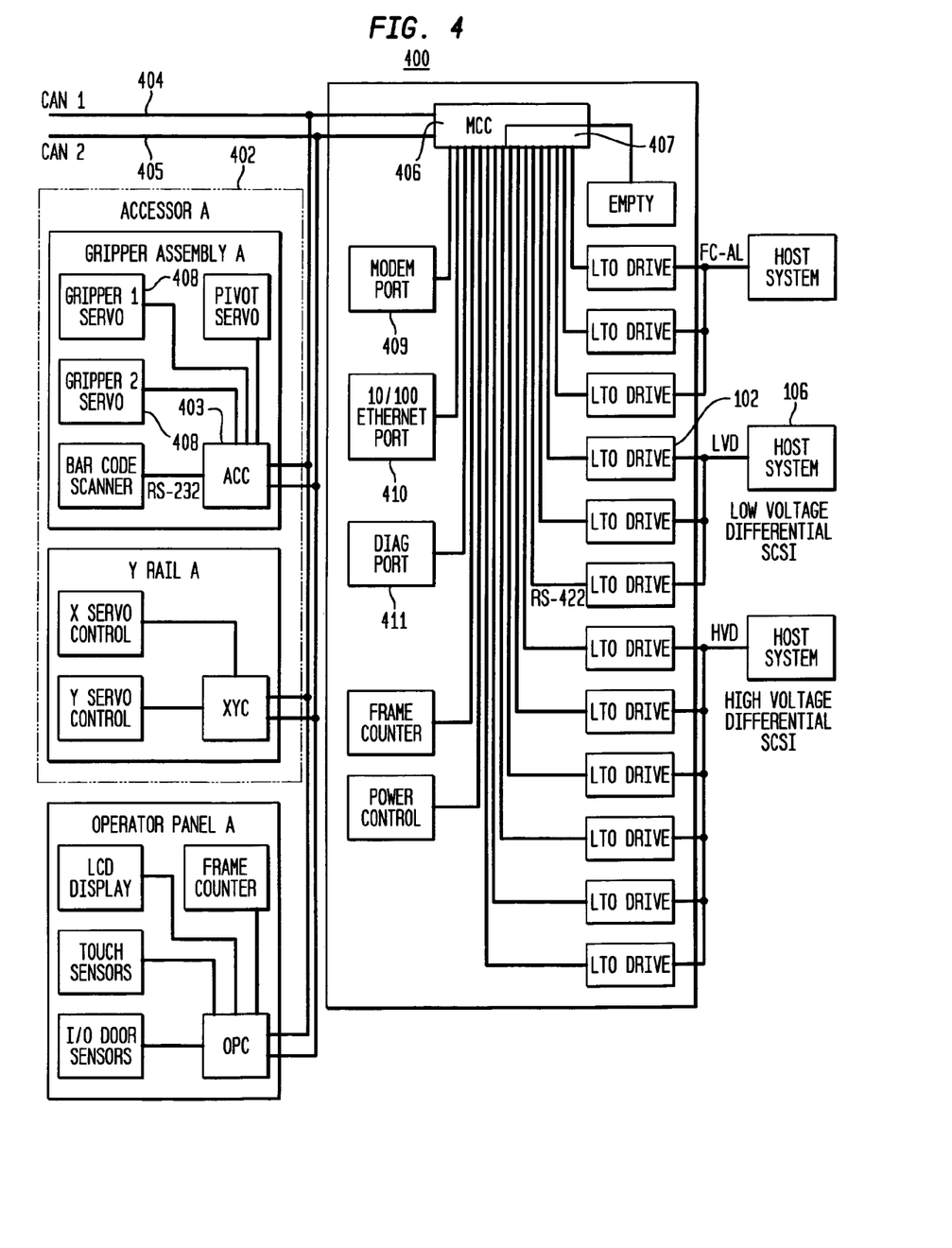
FIG. 4 illustrates an aspect of the invention as embodied in an automated storage library.

Access authorization, i.e., authentication generally involves secure access to a computer system and may comprise a login (userid, password, etc), encryption of data, decryption of data, a combination of encryption and decryption of data comprising public keys, private keys, IDEA, RSA, and the like for gaining access to system resources. Biometric, e.g., retina scan, fingerprint scan, voice scan, etc, or physical keys such as, for example, electronic keys, SmartCard™, magnetic ID's, etc may also be used for purposes of gaining access to system resources. It should be noted that all such authentication methods are within the scope of this invention. In one aspect of this invention, as shown in FIG. 2, a computer system 200 includes an access authorization program 201 and a processor 202 which is associated with a product 203 via communications line 209, and has data access to a product center computer 205 by means of at least one I/O device 204, which is preferably integrated but may be peripheral to the processor 202. Hereinafter, the terms "product center", "product center computer", and "product center computer system" may be used interchangeably to represent one or more computing systems located at a remote dial-in product center, i.e., facility. It should be noted that the remote product center may include a repair center, service center, manufacturing site, development site, or any other facility or combination of facilities associated with remote product support. Additionally, a computer system which is associated with a product center facility may comprise the product computer system and computer systems that are not physically co-located in the product center facility such as, for example, a product center technician's laptop computer located at the technician's home, a manufacturing site computer, a local field office computer, and the like. Computer system 200 may comprise, for example, at least one mainframe computer, laptop computer, desktop computer, workstation, hand held computer, embedded system, i.e. integrated into the product 203, discrete logic or circuit, and the like. The product 203 may include, but is not limited to an automated storage library (FIG. 4 400). According to one aspect of the invention, the product center computer 205 includes a corresponding access authorization program for completing a request for logon from the product center 205 to the product 203 in accordance with a Call In feature, for example. According to another aspect of the invention, any computer system associated with the product center 205, such as manufacturing site computer 210, may complete a Call In feature by using a valid, i.e., unexpired, access authorization generated by the inventive method. Additionally, it should be noted that a Call In may be computer initiated or personnel initiated. These aspects of the invention may use non-volatile memory, i.e. NVRAM 208 as well as other memory including but not limited to a hard disk drive (HDD), flash PROM, EEPROM, COMPACTFLASH™, SmartMedia™, etc., for running the various inventive functions under an operating system that is compatible with the processor 202.

The product center 205, which is generally physically separate and remote from the product 203, may comprise, for example, at least one mainframe computer, laptop computer, desktop computer, workstation, hand held computer, embedded system, discrete logic or circuit, and the like. Data communications 207 between the product center 205 and the product 203 may take place over a dedicated line, telephone line, the Internet, LAN, WAN, Wireless link, e.g., optical link or RF link, or any other channel in which communications may be established as known in the art. Various aspects of the invention may also reside in or peripheral to the product center 205 for sending unique data, access authorization generation and access authorization validation, such as shown in FIG. 2 at 206. This aspect of the invention may also use non-volatile random access memory, i.e. NVRAM, as well as other memory such as a hard disk drive, flash PROM, EEPROM, COMPACTFLASH™, SmartMedia™, etc., for running the various inventive functions.

In accordance with an aspect of the present invention, when the product 203 makes a decision to Call Home, access authorization is generated for a possible future Call In data communications connection. Unique data are processed by implementing a mathematical algorithm, which creates a function of the unique data. In a preferred aspect of the current invention, the mathematical algorithm may perform any number of suitable operations on the unique data. For example, a rotation of the product unique data in a predetermined direction by a predetermined number of bits is performed. Then the results are shifted in another predetermined direction by another predetermined number of bits. Similarly, the service center unique data are rotated and shifted in yet another direction and predetermined number of bits. An operation, such as, for example, an EXCLUSIVE-OR, using both the resulting library unique data and the resulting service center unique data is performed. That result may be converted to ASCII for a passphrase, i.e., password style logon authorization. It should be noted, however, that a conversion to ASCII for a passphrase style logon authorization is not required, and the authorization generated may remain binary and be used as a more general access authorization. In a preferred implementation of the current invention, the unique data from the product computer and the unique data from the service center computer are used to generate one or more encryption keys. The keys, preferably, may be generated in such a manner that no encryption key is actually sent over the communication link 207, thereby eliminating the possibility of key interception via the link 207. Additionally, an authentication calculation may be required bi-directionally such that a userid, password, encryption key, decryption key, etc is required for communication to the product center 205 as well as to the product computer system 200.

Figure 3:
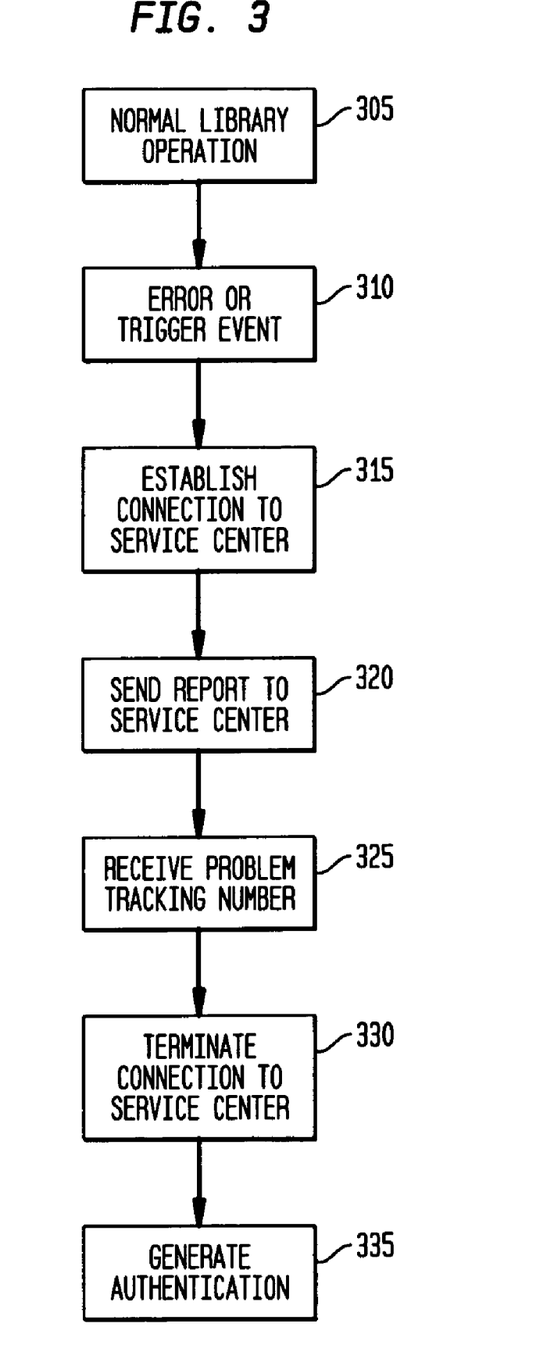
FIG. 3 is a flow diagram depicting the access authorization method according to the present invention.

As shown in FIG. 3 for example, normal library operation occurs at step 305. When an error, such as a library detected error, or other predetermined condition occurs, such as a condition repeating at periodic intervals, e.g. for reporting data, as shown at step 310, a trigger event is generated, causing the product 203 to initiate a Call Home communication by establishing a connection to the service center at step 315. The connection to the server may be implemented with a phone connection using a MODEM, an Internet connection, i.e., WAN, Intranet connection, i.e., LAN, a wireless connection, Fibre Channel bus, satellite link, etc. Once the connection has been established, a report of the condition is sent to the product center 205 at step 320. This report may be an error report (in the case of a library detected error), a status report (in the case of a periodic interval), or some other data. The report may also include product serial number or some randomly generated number. As shown in FIG. 3, during this Call Home communication, preferably, the product receives a problem tracking number at step 325. Other unique data, e.g. random data, could be generated and may also be used in an authentication step. The connection to the service center is then terminated at step 330.

Figure 5:
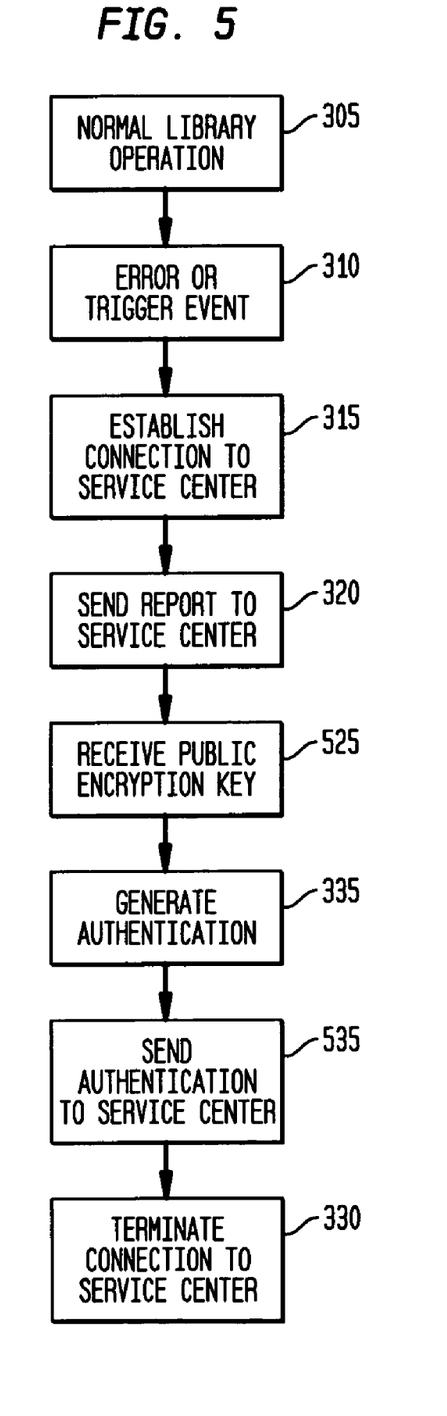
FIG. 5 is a flow diagram depicting the access authorization method of the present invention according to an embodiment employing encryption in an automated data storage system.

As shown at step 335, an authentication is then generated. The authentication generation may comprise a calculation within the library for determining an authentication such as userid, password, encryption key, decryption key, etc. The authentication is based on unique data. The library is then configured to allow the new authentication data, and an optional expiration period may be set. The problem tracking number, or similar data, represents data from which the unique data may be derived, and in a preferred implementation of the invention, used in the authentication generation step 335 to create a dynamic, unpredictable passphrase. A mathematical function, such as the bit rotation, shifting and EXCLUSIVE-OR'ing on the data as discussed above, is run on the unique data, as exemplified by the problem tracking number received at step 325. In step 335, the same mathematical function is run on the data, e.g. the problem tracking number of step 325, at the service center 205 as is done at the product computer system 200. This function creates a value which is the same at the product computer system 200 and the product center 205. Preferably, this value is stored on both product and product center computer systems as the passphrase for future login authorization validation when the product center 205 wishes to initiate communications, i.e., establish a new data communications connection, for access to the product 203, e.g., a Call In communication. Note that advantageously, the passphrase or access authorization, i.e., authentication, is not exchanged between the product computer system 200 and the product center 205, rather unique data known to at least the product computer system 200 is transferred to then generate the access authorization independently on the product side, i.e. product computer system 200, and at the product center 205. It should be noted that the order of certain steps, as shown in FIGS. 3 and 5 may be modified without affecting the scope of the invention, For example, the order of steps 320 and 325 may be reversed. Additionally, for example the order of steps 330 and 335, 320 and 525 may be reversed. FIG. 5 showing like steps numbered the same as steps in FIG. 3, depicts another aspect of the invention. After sending a report to the service center, i.e., product center 205, the product computer system 200, as in FIG. 5 at step 525, receives a public encryption key via transfer from the product center 205 before generating the authentication at step 335. The encrypted access authentication is then sent to the service center at step 535. The connection to the service center is then terminated at step 330.

During a Call In communication, the product center 205, either automatically or manually, through associated personnel, transmits the passphrase or access authorization generated previously during the Call Home phase. The product computer system 200 receives and validates the authorization, thus allowing access to the product 203, e.g., for further testing, diagnostics and repair. As an additional security measure, the passphrase, i.e., access authorization is invalidated after a predetermined time, thus requiring a new access authorization generation for subsequent access to the product 203. In the event of multiple Call Home events, a preferred aspect of the current invention may allow multiple valid access authorizations. Alternatively, it is within the scope of the current invention to only validate a most recent access authorization, established by the most recent Call Home event, or alternatively, only validate a least recent access authorization, as determined from the least recent Call Home event. These and other access authorization management algorithms are contemplated by the current invention.

Another aspect of the invention provides for access authorization generation as a function of unique data from both the product computer system 200, and the product center 205. The mathematical function uses both data to generate an even more unpredictable access authorization. For example, during the Call Home phase, i.e., phase where the product computer system 200 initiates data communications with the product center 205, the product computer system 200 sends a serial number as unique data and the product center 205 sends a problem tracking number as unique data. The product computer system 200 and the product center 205 run the same mathematical function on both data. Security is enhanced because now, there is a changing component, i.e., the problem tracking number, to the input of the access authorization generating mathematical function.

FIG. 4 shows an automated tape library 400 in which the system and method of the invention may be implemented. The automated tape library includes an accessor device 402 including gripper devices 408 for accessing storage media under control of an associated accessor controller (ACC) 403. Data communication between the accessor 402 and a media changer controller (MCC) 406 for controlling robotic movement of media between storage drives 106 and storage bins 109 occurs through controller area networks (CAN) 1 404 and CAN 2 405. In a preferred implementation of the invention, a portion of memory within the MCC at 407 has been reserved for running the access authorization function. For illustrative purposes, assuming a Gripper 2 Servo (G2S) component 408 has failed in the storage product, a G2S failure code is generated and propagated through the ACC 403 and on to at least one of CAN's 404 and 405. The MCC 406 receives the failure data and initiates a communication with a product center 205, i.e., a Call Home communication, (as discussed above, authentications are generated during a Call Home data communications connection), via one or more of communication ports 409, 410, 411. Additionally, since MCC 406 is running the access authorization code, the MCC 406 also sends a unique data item, such as the serial number of the failed component G2S 408, to the product center 205. During this Call Home communication, the product center 205, also running the access authorization code, sends to the MCC 406 a unique data item, for example, the problem tracking number associated with the G2S failure communication. At this time, both systems, i.e., the library 400, via MCC 406, and the product center 205 have, in this case, the two unique data items, as discussed above. The access authorization programs executing in the respective MCC 406 and the product center 205, each independently generate the same access authorization by inputting the unique data items into the same mathematical function. The product center 205, either automatically or through manual intervention, may now initiate a Call In communication, i.e., from product center 205 to library 400 via MCC 406, using, for example, a passphrase resulting from the access authorization generation, as discussed above. One aspect of the current invention is the provision of a mechanism for limiting the valid time of the passphrase, and after a predetermined time rendering the passphrase invalid. Subsequent access authorization from the product center would then have to be derived from a subsequent Call Home communication from the library 400, preferably via MCC 406.

Now that the invention has been described by way of a preferred embodiment, various modifications and improvements will occur to those of skill in the art. For example, the program can alternatively be designed to run on a device with or without a HDD. In another possible embodiment, the program may be designed to run in a processor that is physically distinct from the product that grants authorization. Thus, it should be understood that the preferred embodiment is provided as an example and not as a limitation. The scope of the invention is defined by the appended claims.

We claim:

1. A method for generating access authorization between computer systems in data communications over a data communications connection, said method comprising:
    a) in a first communication session established between first computer system and second computer system, transferring unique data from said first computer system to said second computer system, said second computer system including a client device adapted to receive product support from said first computer system, said transferring of said unique data being uni-directional;
    b) both said first and said second of said computer systems independently generating a logon access authorization value as a function of the unique data, the value being stored at each respective first and second computer systems; and
    c) during a subsequently established second communication session between first computer system and second computer system, said first computer system requesting logon access to said second computer and transmitting said independently generated logon authorization value to said second computer system, said second computer system validating the logon access authorization value to permit logon access to said second computer system and provide product support services to said client device by said first computer system during said second communication session.

2. The method for generating access authorization as claimed in claim 1, comprising randomizing said unique data, wherein said function of said unique data is random.

3. The method for generating access authorization as claimed in claim 1, comprising deriving said unique data from a problem tracking number created during said data communications, wherein said function of said unique data is dynamic.

4. The method for generating access authorization as claimed in claim 1, further comprising invalidating the access authorization after a predetermined time.

5. The method for generating access authorization as claimed in claim 1, wherein said transferring of said unique data is bi-directional.

6. The method for generating access authorization as claimed in claim 5, wherein said transferring unique data comprises:
    sending a serial number from the second of said computer systems to the first of said computer systems; and
    sending a problem tracking number from the first of said computer systems to the second of said computer systems.

7. The method for generating access authorization as claimed in claim 6, comprising deriving said unique data from said serial number and said problem tracking number wherein said function of said unique data is dynamic.

8. The method for generating access authorization as claimed in claim 1, wherein the first of said computer systems comprises a product center computer system associated with a product center facility, and the second of said computer systems comprises a product computer system associated with operation of a product.

9. The method for generating access authorization as claimed in claim 8, comprising said product computer system establishing said data communications connection upon detecting a trigger event in said product computer system.

10. The method for generating access authorization as claimed in claim 9, wherein an err or condition within said product generates said trigger event.

11. The method for generating access authorization as claimed in claim 10, wherein only an access authorization associated with a most recent said error condition is valid.

12. The method for generating access authorization as claimed in claim 10, wherein only an access authorization associated with a least recent said error condition is valid.

13. The method for generating access authorization as claimed in claim 9, wherein an error condition within said product computer system generates said trigger event.

14. The method for generating access authorization as claimed in claim 9, wherein a predetermined condition generates said trigger event at periodic intervals.

15. The method for generating access authorization as claimed in claim 9, further comprising terminating said data communications connection after said transferring of the unique data.

16. The method for generating access authorization as claimed in claim 8, further comprising any computer system associated with the product center facility initiating a new connection to said product computer system by using the access authorization, wherein said validating step enables said new connection to successfully continue.

17. The method for generating access authorization as claimed in claim 8, wherein the product comprises an automated storage library.

18. The method for generating access authorization as claimed in claim 1, wherein:
    said transferring of the unique data farther comprises said second of said computer systems receiving a public encryption key from said first of said computer systems; and
    said generating said access authorization further comprises sending an encrypted said access authorization to said first of said computer systems.

19. A system for generating access authorization between computer systems in data communications over a data communications connection, said system comprising:
    means for transferring unique data from a first computer system to a second computer system during a first communication session established between said first computer system and said second computer system, said second computer system including a client device adapted to receive product support from said first computer system, said transferring of said unique data being uni-directional; and,
    means implemented at each said first and second computer system for independently generating a logon access authorization value as a function of the unique data, the value being stored at each respective first and second computer systems, wherein in a second communication session established between first computer system and second computer system said first computer system subsequently requests logon access to said second computer and transmits said independently generated logon authorization value to said second computer system, said second computer system implementing a means for validating the logon access authorization value and permitting logon access to said second of said computer system to enable provision of product support services to said client device by said first computer system during said second communication session.

20. The system for generating access authorization as claimed in claim 19, comprising means for randomizing said unique data, wherein said function of said unique data is random.

21. The system for generating access authorization as claimed in claim 19, wherein said means for transferring unique data comprises exchanging a serial number and a problem tracking number between said computer systems.

22. The system for generating access authorization as claimed in claim 21, further comprising a means for deriving said unique data from said serial number and said problem tracking number, wherein said function of said unique data is dynamic.

23. The system for generating access authorization as claimed in claim 19, wherein The first of said computer systems comprises a product center computer system associated with a product center facility, and the second of said computer systems comprises a product computer system associated with operation of a product.

24. The system for generating access authorization as claimed in claim 23, wherein means for first establishing said data communications connection is initiated upon a result from a means for detecting a trigger event in said product computer system.

25. The system for generating access authorization as claimed in claim 24, wherein said trigger event comprises an error condition within said product.

26. The system for generating access authorization as claimed in claim 25, wherein only an access authorization associated with a most recent said error condition is valid.

27. The system for generating access authorization as claimed in claim 25, wherein only an access authorization associated with a least recent said error condition is valid.

28. The system for generating access authorization as claimed in claim 24, wherein a predetermined condition generates said trigger event at periodic intervals.

29. The system for generating access authorization as claimed in claim 24, comprising means for terminating said data communications connection after said transferring the unique data.

30. The system for generating access authorization as claimed in claim 29, further comprising means for initiating a new data communications connection by any computer system associated with said product center computer system using a result of said access authorization generating means, wherein said means for validating enables said new connection to be successfully established.

31. The system for generating access authorization as claimed in claim 23, wherein the product comprises an automated storage library.

32. The system for generating access authorization as claimed in claim 19, further comprising:

said means for transferring unique data including means for transferring a public encryption key from the first of said computer systems; and said means for generating access authorization including means for returning an encrypted said access authorization to the first of said computer systems.

33. A program storage device readable by machine, tangibly embodying a program of instructions executable by the machine to perform method steps for generating access authorization between computer systems in data communications over a data communications connection, said method steps comprising:

a) in a first communication session established between a first computer system and a second computer system, transferring unique data from said first computer system to said second computer system, said second computer system including a client device adapted to receive product support from said first computer system, said transferring of said unique data being unidirectional;

b) both said first and said second of said computer systems independently generating a logon access authorization value as a function of the unique data, the value being stored at each respective first and second computer systems; and c) during a subsequently established second communication session between first computer system and second computer system, said first computer system requesting logon access to said second computer and transmitting said independently generated logon authorization value to said second computer system, said second computer system validating the independently generated logon access authorization value to permit access to said second computer system and provide product support services to said client device by said first computer system during said second communication session.

34. The program storage device as claimed in claim 33, said method steps further comprising randomizing said unique data, wherein said function of said unique data is random.

35. The program storage device as claimed in claim 33, said method steps further comprising deriving said unique data from a problem hacking number created during said data communications, wherein said function of said unique data is dynamic.

36. The program storage device as claimed in claim 33, wherein the access authorization is invalidated after a predetermined time.

37. The program storage device as claimed in claim 33, wherein said transferring unique data comprises:

sending a serial number from the second of said computer systems to the first of said computer systems; and sending a problem tracking number from the first of said computer systems to the second of said computer systems.

38. The program storage device as claimed in claim 37, said method steps further comprising, deriving said unique data from said serial number and said problem tracking number wherein said function of said unique data is dynamic.

39. The program storage device as claimed in claim 33, wherein the first of said computer systems comprises a product center computer system associated with a product center facility, and the second of said computer systems comprises a product computer system associated with operation of a product.

40. The program storage device as claimed in claim 39, comprising said product computer system establishing said data communications connection upon detecting a trigger event in said product computer system.

41. The program storage device as claimed in claim 40, wherein an error condition within said product generates said trigger event.

42. The program storage device as claimed in claim 40, said method steps further comprising terminating said data communications after said transferring said unique data.

43. The program storage device as claimed in claim 39, said method steps further comprising any computer system associated with the product center computer system initiating a new data communications connection to said product computer system by using said access authorization, wherein said validating step enables said new data communications connection to be successfully established.

44. The program storage device as claimed in claim 40, wherein the product comprises an automated storage library.

45. The program storage device as claimed in claim 33, wherein:

said transferring said unique data comprises said second of said computer systems receiving a public encryption key from said first of said computer systems; and said generating said access authorization further comprises sending an encrypted said access authorization to said first of said computer systems.

\* \* \* \* \*